(No Model.)
C. A. CRIQUI.
FILTER.
No. 511,756. Patented Jan. 2, 1894.
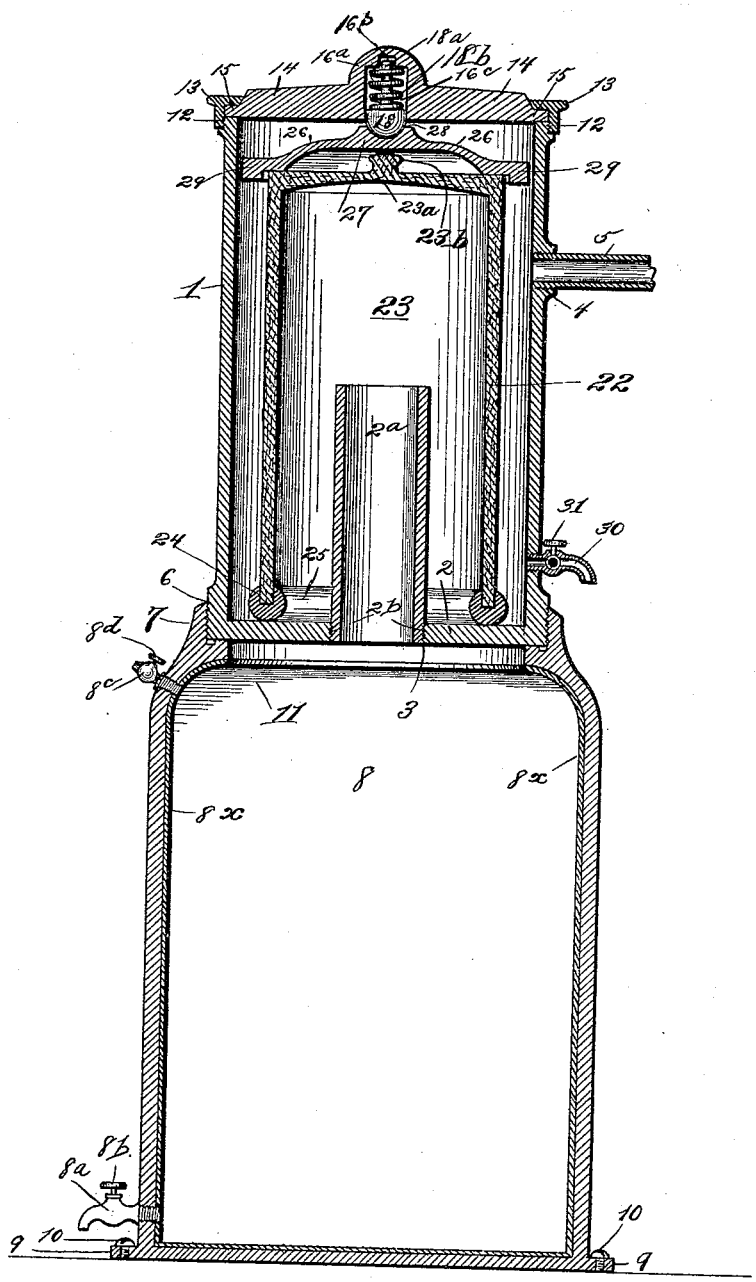
Witnesses.
M. P. Smith.
G. Y. Thorpe.
Inventor.
Chas. A. Criqui.
By Higdon & Higdon
att'ys.
THE NATIONAL LITHOGRAPHING COMPANY,
WASHINGTON, D. C.

UNITED STATES PATENT OFFICE.

CHARLES A. CRIQUI, OF ST. JOSEPH, MISSOURI.

FILTER.

SPECIFICATION forming part of Letters Patent No. 511,756, dated January 2, 1894.

Application filed June 21, 1892. Serial No. 437,497. (No model.)

*To all whom it may concern:*

Be it known that I, CHARLES A. CRIQUI, of St. Joseph, Buchanan county, Missouri, have invented certain new and useful Improvements in Filters, of which the following is a full, clear, and exact description, reference being had to the accompanying drawing, forming a part hereof.

My invention relates to appliances for separating solid sediment, impurities and foreign substances from water and other liquids, and the objects of my invention are to produce a filter which shall be simple, durable, compact and inexpensive in construction, and which shall be continuous and very effective in its operation and the parts of which shall also be so constructed as to permit very readily of separation for the purpose of renewal or cleansing or the like; furthermore, to produce a filter which in addition to the advantages above enumerated shall be perfectly free from all liability of admixtures of sediment or impurities with the water or other liquid which has thus been filtered.

To the above purposes my invention consists in certain peculiar and novel features of construction and arrangement as hereinafter described and claimed.

In order that my invention may be fully understood, I will proceed to describe it with reference to the accompanying drawing, which represents a vertical sectional view of a filter constructed in accordance with my invention.

In the said drawing, 1 designates the body-portion of the filter; this filter body-portion being shown as of vertical cylindrical form and it is to be understood that this body-portion may be of any suitable or preferred material capable of receiving the liquid which is to be filtered, and furthermore, that it may be either of cylindrical form as just described, or of any other suitable or preferred form as circumstances may render desirable. The bottom 2 of this filter is provided with a central opening 3 for the discharge of the filtered liquid and one side of the body-portion of the filter is provided with an internally screw-threaded opening 4 into which is inserted the feed-pipe 5; the said feed-pipe being suitably connected to the supply-pipes of the water supply system or to the pump or any other series of water supply. In order to prevent any sediment from flowing or passing into the receptacle 8 when the filter-wall is removed for cleaning, as hereinafter referred to, I provide a vertical pipe $2^a$, the lower end of which is externally screw-threaded at $2^b$, to enter the opening 3 in the bottom of the filter; this opening being internally screw-threaded to receive the pipe. The lower end of this body-portion 1 of the filter is externally screw-threaded as at 6 and fits into an internally screw-threaded flange 7 which is formed at the upper end or top of the receptacle 8 for filtered liquid. This receptacle 8 is shown as of vertical cylindrical form and as provided with an internal lining $8^\times$ of tin or any other suitable material, and also as having at its lower end an external flange 9 through which pass a number of attaching screws 10 for securing the receptacle in position upon any suitable supporting structure, such as a shelf or a table, or the like.

It is to be understood that the receptacle 8 for filtered liquid may be either of the described vertical cylindrical form or of any other suitable or preferred form and also that it may be of metal or of any other suitable or preferred material. The upper end of this receptacle 8 is formed with an opening 11 through which the filtered liquid passes out of the opening 3 above mentioned on its way into the interior of the receptacle 8.

In the lower part of the receptacle 8 is inserted a suitable draw-cock or faucet $8^a$ having a suitable valve $8^b$, and in the upper part of the receptacle 8 is inserted a suitable vent $8^c$ which is provided with a suitable hand-valve $8^d$, as shown in the drawing. The arrangement is such that the filtered water may be drawn off as required, through the faucet $8^a$; the vent supplying air to maintain the necessary hydrostatic conditions for discharge.

The upper end of the body-portion 1 of the filter is externally screw-threaded as at 12 to receive a ring 13 the internally screw-threaded pendent flange of which engages the screw-threaded upper end of the body-portion 1.

14 designates the top of the filter, this top having an outwardly extending marginal flange 15 which is embraced by the ring 13 just described; the ring 13 thus serving to retain the top 14 in its proper position, and the flange 15 of said top resting directly upon the upper end of the body-portion of the filter.

22 designates the filtering wall of the device; this wall being of any material or composition of materials sufficiently porous to permit the water to percolate or seep through it from without into its inner cavity or chamber 23. As shown, this filtering wall is of longitudinal vertical cylindrical form and of less height and diameter than the height and diameter of the body-portion 1 of the filter. This filter wall is also shown as provided with a closed top $23^a$ which is of the same material as the body portion of the filtering wall and which is shown as integral therewith; this top being preferably provided with an upwardly extending knob $23^b$ for facilitating the removal of the filtering-wall when required. It is to be understood that this filtering wall may be of the precise form shown and above specified or of other suitable or preferred form, it being essential, however, to the invention that the height and diameter of the filtering wall be less than the corresponding height and diameter of the body-portion of the filter, so that a space shall surround the sides and the top of the filtering-walls. The lower end of this filtering wall is left entirely open and its lower margin is inserted into a groove 24 which is formed in the upper side of an annular elastic ring 25. This ring is of rubber, felt or any other suitable material adapted to exclude water, and at the same time possessing sufficient elasticity to act effectively as a packing, and the said ring rests directly upon the bottom 2 of the body 1 of the filter.

Upon the upper end of the filter wall 22 rests a horizontal presser-bar 26; this presser bar being of metal or of any other suitable material and consisting of two oppositely extending arms, the upper ends of which are united to a central socket-piece 27. The upperside of this socket-piece is formed with a cavity 28 preferably of hemispherical form, to receive the presser-head hereinafter referred to. At their outer ends, the arms 26 are provided with lateral or longitudinal enlargements 29, which, when the parts are in operative position, rest upon the upper end of the filtering wall 22.

At its center the top 1 is formed with a boss $16^a$ which is closed at its top, and the presser-head 18 which is approximately hemispherical in form and rests in the recess 28 of the presser-bar 26, is formed with an upwardly extending stem $18^a$ which enters a recess $16^b$ in the under side of the top of the boss $16^a$. A spiral-expansion spring $18^b$ surrounds the stem $18^a$ and is located within a cavity $16^c$ which is formed in the middle of the top 14 at a point beneath the boss $16^a$. It will thus be seen that when the parts are in position, the spring $18^b$ presses the head 18 downward into the cavity 28, and compresses the gasket or ring tightly upon the bottom 2 of the filter. The pressure of the water within the body-portion of the filter is usually sufficient to compress the gasket or ring 25, but the spring-pressure forms an additional safeguard.

A suitable faucet 30 with a valve 31 is shown as projecting laterally from the lower part of the body portion 1 of the filter and as connecting with the interior of the body portion for a purpose to be presently explained.

Now, in using this filter, the parts being in the relative positions described, and the filter wall 22 being pressed down firmly upon the packing ring 25, water or other liquid is permitted to flow through the inlet pipe 5 into the body-portion 1 of the filter and to fill or partially fill the space which intervenes between the body portion of the filtering wall 22. Owing to the presence of the packing ring 25 the water cannot enter beneath the filtering wall 22 but is compelled to percolate or seep through the porous filtering wall at the sides and top thereof. Consequently, all solid impurities and other foreign substances are retained within the space which intervenes between the body portion of the filter and the filtering wall 22, and such impurities and foreign substances rapidly settle into the lower part of this intervening space. The pure liquid passes into the interior of the filtering wall and thence downward through the opening 3 into the body portion of the filter, and is finally received within the receptacle 8.

When it is desired to partially cleanse the filter the valve 31 of the faucet 30 is opened and a continuous flow of liquid is permitted to take place for a sufficient length of time removing virtually all of the impurities from the intervening space of the filter. Should a more thorough cleansing of the filter be required, the ring 13 is first removed and the top 14 of the filter is then also removed, after which the filtering wall 22 can be readily removed and cleansed and the interior of the filter can also likewise be thoroughly cleansed.

From the above description it will be seen that I have produced a filter which is simple, durable, and inexpensive in construction and reliable and continuous in its operation, and which thoroughly separates all impurities or foreign substances of any nature from the liquid and prevents any possibility of subsequent admixture of the filtered liquid with such substances.

Having thus described my invention, what I claim as new therein, and desire to secure by Letters Patent, is—

In a filter, the combination with, a cylindrical casing having an open upper end, screw-threaded exteriorly, and a filtering wall located within said casing and having a closed top provided with a handle thereon, and a presser-bar mounted upon the upper end of the filtering wall, and having a recess in its upper side, a removable top for the casing having a vertical recess in its under side, and a vertically adjustable presser head fitting in said recess, and having a stem and a spring surrounding said stem and bearing at the upper side of the presser head and the top of the recess, with a screw-threaded ring or annulus fitting upon the top and engaging the exteriorly threaded upper end of the casing to hold the top in position, substantially as described.

In testimony whereof I affix my signature in the presence of two witnesses.

CHARLES A. CRIQUI.

Witnesses:
J. G. WILLIAMS,
B. J. CASCUT.